Aug. 7, 1956
F. F. KOLBE
2,757,462
ROTARY CUTTING WHEEL TYPE EXCAVATING APPARATUS
Filed Sept. 10, 1952
2 Sheets-Sheet 2
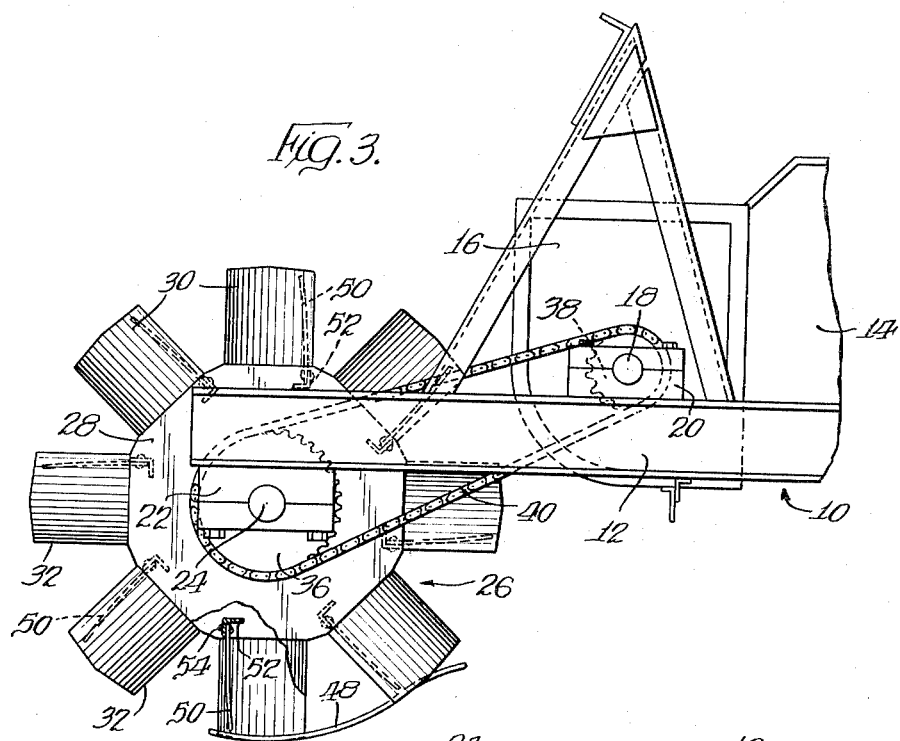
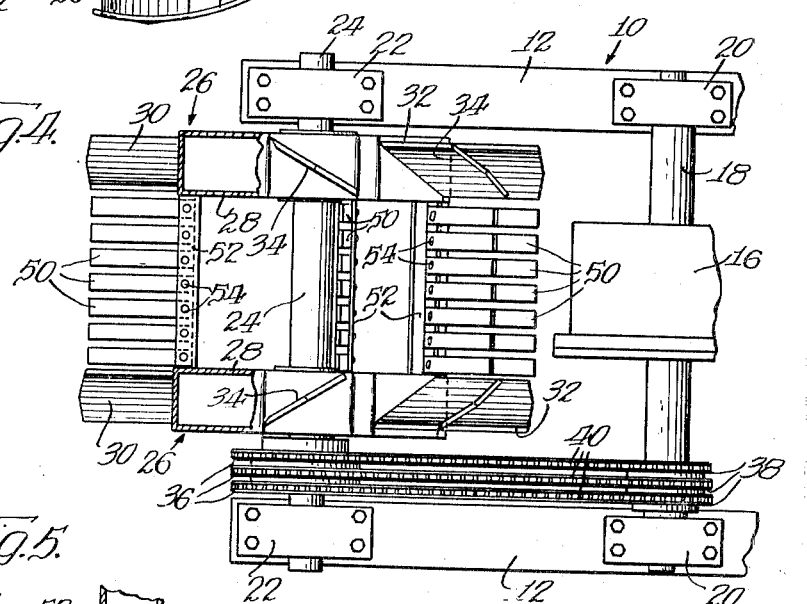
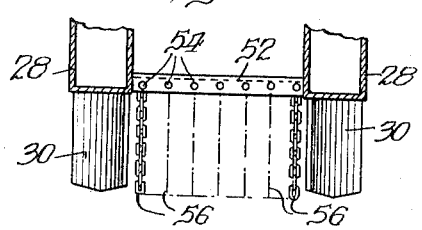
INVENTOR.
Frank F. Kolbe
BY Brown, Jackson,
Boettcher & Dienner
Attys.

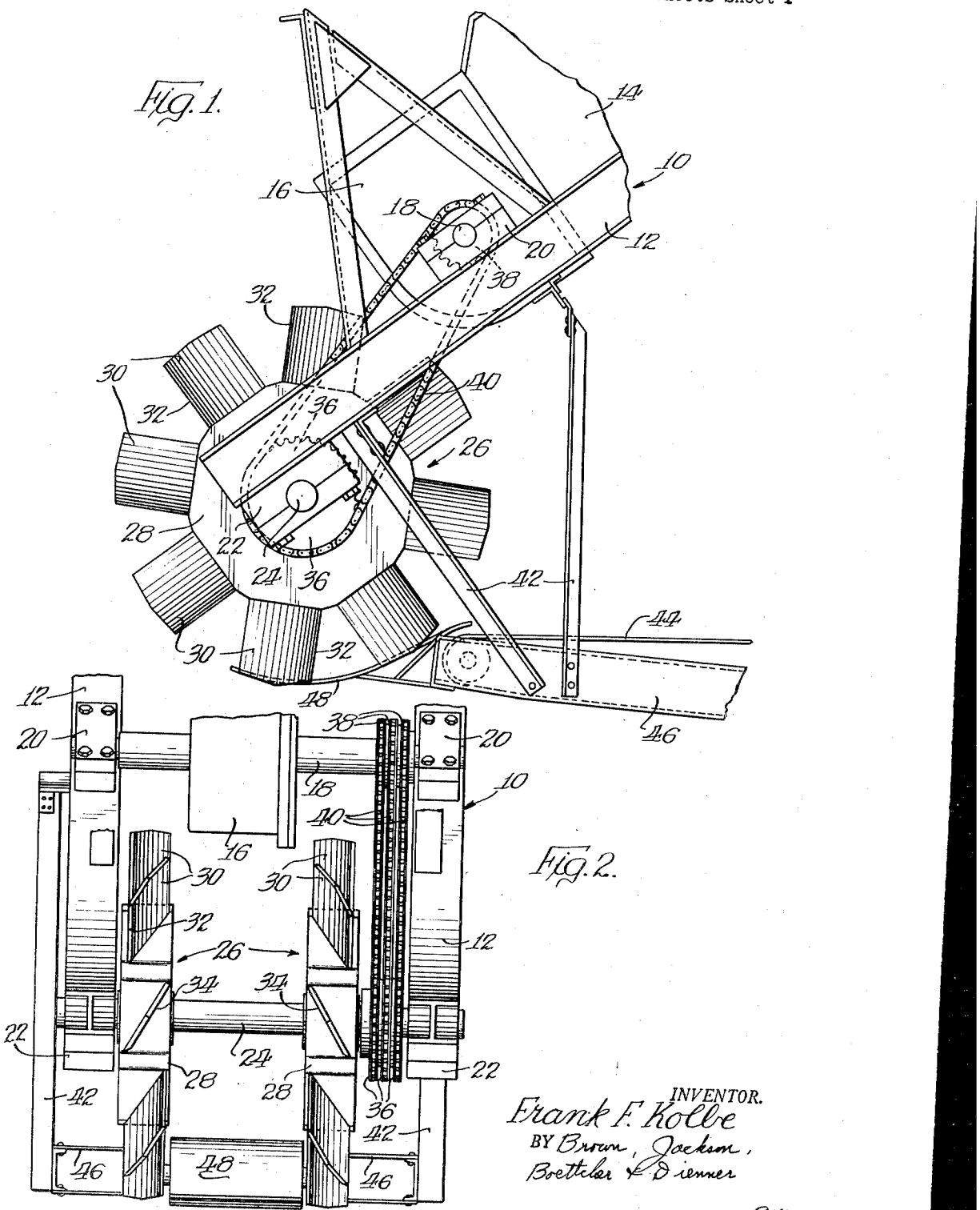

United States Patent Office 2,757,462
Patented Aug. 7, 1956

2,757,462
ROTARY CUTTING WHEEL TYPE EXCAVATING APPARATUS

Frank F. Kolbe, Chicago, Ill., assignor to The United Electric Coal Companies, Chicago, Ill., a corporation of Delaware Application September 10, 1952, Serial No. 308,817

7 Claims. (Cl. 37—190)

The present invention relates to improvements in excavating apparatus and, particularly, to improved excavating apparatus of the character disclosed in my copending application, Serial No. 281,950, filed April 12, 1952.

In my copending application, I have disclosed excavating apparatus comprising a cutting wheel including two spaced rows of cutters or cutting blades rotated at the same speed and in the same direction. The cutters of each row are inclined from the outside toward the inside of the wheel in the direction of rotation of the cutters so that material cut by the blade is moved into and retained in the space between the two rows of cutters. Due to the inclination of the blades and the centrifugal force and peripheral speed thereof, the material between the blades is conveyed thereby onto a conveyor disposed rearwardly of the wheel and extending into the space between the rows of blades.

The present invention is directed to excavating apparatus employing substantially the same cutting wheel and including improved drive means therefor and improved material breaking and conveying means therefor.

In my copending application, two cutting wheels are preferably provided, each having a single row of cutting blades, and the two wheels are mounted in spaced relation on a shaft to form the complete wheel described hereinbefore. The shaft is supported and driven by suitable means engaging the shaft intermediate the two wheels so that the cutting wheels are provided with an inboard drive. While an inboard drive provides certain advantages, some disadvantages accompany the use thereof, one such disadvantage being the inability to provide material breaking and conveying means between the rows of blades rotatable with the wheels.

It is an object of the present invention to provide outboard drive means for excavating apparatus of the character described.

Another object of the invention is to provide an outboard drive for excavating apparatus of the character described that readily accommodates the utilization of material breaking and conveying apparatus associated with the cutting wheels.

A further object of the invention is the provision of excavating apparatus of the character described including means extending into the space between the rows of cutting blades and rotatable therewith for breaking up and conveying materials cut by the blades so that the material is efficiently fed in small particles to the conveyor at the rear of the cutting wheel.

A still further object of the invention is the provision of excavating apparatus of the character described including fingers, which may be fixed or flexible, extending into the space between the rows of cutting blades to break up and convey materials through the space between the cutting blades.

Other objects and advantages of the present invention will become apparent in the following detailed description of preferred embodiments of the invention, wherein reference is made to the accompanying drawings, in which:

Figure 1 is a side elevation of the excavating apparatus of the present invention;

Figure 2 is a front elevation of the apparatus shown in Figure 1;

Figure 3 is a side elevation, similar to Figure 1 but omitting the conveyor and its frame, of apparatus including the material breaking and conveying means of the present invention, a portion of one blade and hub being broken away to clearly show such means;

Figure 4 is a top view, partly in section and partly in plan, of the apparatus shown in Figure 3; and Figure 5 is a partial vertical sectional view of apparatus similar to that shown in Figures 3 and 4, but employing modified material breaking and conveying means.

Referring to the drawings, and particularly to Figures 1 and 2, the apparatus of the present invention includes a frame or digging ladder, indicated generally at 10, which is adapted to be pivotally supported for horizontal and vertical swinging movement. The manner of supporting the frame or ladder 10 is well known and is not shown herein. The frame or ladder 10 is further particularly adapted for mounting on a vehicle in a well known manner for transportation from place to place. Such vehicles are of a well known type and carry power drive means for imparting the necessary movements to all movable parts of the apparatus of the present invention.

The frame or digging ladder 10 includes a pair of spaced parallel I-beams 12 supporting a drive motor 14 and a speed reducer 16. Ths speed reducer 16 includes a drive shaft 18 rotatably supported at its ends by bearing 20 mounted on the I-beams 12 in spaced relation to the ends of the beams. At the outer end thereof, each beam 12 is provided with a bearing block 22 rotatably supporting a digging wheel shaft 24. A pair of digging wheels 26 are mounted on the shaft 24 in spaced parallel relation and each wheel comprises a hub portion 28 secured to the shaft and a plurality of cutting blades or cutters 30 mounted on the periphery of the hub and extending substantially radially therefrom. The hub portions 28 have been shown herein as comprising octagonal drums, to each surface of which one blade 30 is secured, as by welding, or the like. The use of a polygonal drum for the hub portions 28 is convenient, since such drums provide flat surfaces to which the blades 30 may be readily secured. It will be apparent, however, that the hub portions 28 can be formed in any manner desired and may constitute, for example, cylindrical plates rather than polygonal drums. Likewise, the cutters 30 are preferably formed separately from the hub portion 28 and suitably secured to the peripheral surfaces of the hub portion 28, but it will be apparent that the blades can be secured in any desired manner to the hub portions and, may, in fact, be formed integrally therewith.

The blades 30 each present a leading edge 32, with the leading edge of each of the blades being preferably sharpened to provide a cutting edge adapted to be moved against a bank of material. As shown in the drawings, the cutting blades 30 each comprise a plate of metal secured to the flat peripheral surfaces of the octagonal drums 28 and extending diagonally thereof. It will be appreciated, however, that the blades 30 can take any desired configuration, so long as the blades each present, according to the present invention, an inclined surface 34 extending from the blade's leading edge 32, which is adjacent the outer side of the wheel hub 28, inwardly toward the inner side of the wheel hub 28.

To drive the cutting wheel comprising the two wheels 26 and the shaft 24, one of the wheels 26 is spaced from the adjacent I-beam 12 to accommodate the mounting of a plurality of sprockets 36 on the shaft 24. A like number of sprockets 38 are mounted on the drive shaft 18, which is disposed in spaced parallel relation to the wheel shaft 24, in alignment with the sprockets 36 on the shaft 24. Chains 40 are reeved over aligned pairs of the sprockets 36 and 38 to provide a driving connection or power transmission means between the motor 14 and the digging wheels 26. While a chain drive is shown, as is preferred according to the present invention, it will be appreciated that other power transmission means of known structure may be substituted therefor.

The digging ladder 10 includes a plurality of struts 42 extending downwardly therefrom to support a conveyor belt 44 and its associated frame 46. The conveyor 44 is conventional in form with the upper run thereof comprising the material carrying surface. The conveyor is of a width substantially equal to the distance between the cutting wheels 26 and is supported with its end disposed immediately to the rear of the wheels to receive material cut thereby. The conveyor is driven by suitable means, not shown, so that the upper run will carry material away from the wheels.

As shown in Figure 1, the cutting blades 30 are adapted to effect a downward cutting action on a bank of material when the wheels 26 are rotated in a counterclockwise direction. As will be appreciated from Figure 2, the excavating apparatus of the present invention is adapted to be moved transversely, that is, along the surface, of the bank of material to remove a layer of material from the bank, the blades 30 of one wheel effecting the cutting action. The downward cutting action of the blades 30 of the wheel performing the cut forces the cut material into the space between the cutting wheels and forces the material downwardly in the direction of rotation of the cutting wheels in a manner to be described in greater detail hereinafter. A guide plate 48 is suitably secured, as by welding, to the forward portions of the conveyor frame 46 and extends into the space between the cutting wheels at the lower portion thereof. As is clearly shown in Figure 1, the guide plate 48 is positioned adjacent the periphery of the cutting wheels and is arcuately curved in a path generally conforming to the periphery of the wheels. The plate 48 terminates at its rearward end adjacent the upper run, or carrying surface, of the conveyor belt 44. The plate projects forwardly from its point of support into the space between the wheels to receive material from the space between the wheels and guide the same onto the conveyor belt 44. The conveyor 44 extends towards the cutting wheels and terminates adjacent the periphery thereof and has its longitudinal axis extending parallel to the planes of the two wheels and centrally of the space between the wheels. The conveyor is driven in any suitable manner and may lead either directly to a point of disposal or to other conveyors or the like which eventually lead to a point of disposal.

In operation, the apparatus shown in the drawings and described hereinbefore is suitably supported and driven in the manner described hereinbefore. In addition, the frame 10 and associated apparatus may be suitably supported by a supporting beam structure or the like. The apparatus is moved into position so that the peripheral surfaces of the cutting blades 30 will engage the surface of the bank of material to be cut. As the wheels are rotated, the supporting structure and wheels are swung in a horizontal arc to move the cutting blades 30 of the one wheel into engagement with the bank of material to commence a cut. As the rotating cutting wheels traverse or move along the surface of the bank of material, the leading edges 32 of the cutting blades 30 on the one wheel cut away a layer of the bank of material. The blades 30 are so disposed with respect to one another and the rate of advancement of the wheel into the material of the bank is such that the material is cut up into relatively small pieces which are forced, by the inclined surfaces 34 of the blades 30, into the space between the wheels. Any large rocks or the like will not be fed through the blades, due to the spacing and disposition thereof. The inclined surfaces 34 of the blades 30 of the other wheel prevent the passage of cut material from the space between the wheels in a direction transverse to the wheels. The wall of the bank of material being cut forms an end wall which, with the two wheels, defines a chamber within which the material cut by the one wheel is retained. Gravity, centrifugal force, peripheral speed of the cutting blades 30 and the impelling action of the inclined surfaces 34 of the blades 30 force the material within the chamber, defined hereinbefore, downwardly and toward the rearward portions of the cutting wheels. The cut material, so forced downwardly and rearwardly, is forced onto the guide plate 48 and as further material is forced onto the guide plate, the material is moved rearwardly over the guide plate and onto the upper run or carrying surface of the conveyor belt 44. The conveyor belt 44 is driven in a suitable manner and, preferably, at substantially the same rate of speed as the speed of feed of material to the belt so that the belt need not accelerate the material. The travel of the carrying surface of the belt 44 is in the same direction as the direction of feed of material thereto so that the belt is not subjected to transverse strain and, accordingly, is adapted for continued and long service in the apparatus.

In the apparatus of the present invention, as shown in Figures 1 and 2 and as described hereinbefore, the forces of gravity, centrifugal force and peripheral speed cooperate to force the material cut by the cutting blades onto the conveyor. The dirt need not travel any substantial distance in being discharged from the space between the wheels or being discharged from the cutting blades and, accordingly, there is no necessity for providing a time delay for allowing the materials to take the desired course. Therefore, the wheels may be operated at any desired speed. Furthermore, the dirt being cut in passing over the blades 30 automatically performs a cleaning action thereon so that there is seldom any necessity for stopping the excavating apparatus to clean the blades. The conveyor belt is not subjected to impact or transverse strain, nor is it required to accelerate the material fed thereto. From the foregoing, it will be appreciated that the excavating apparatus of the present invention has a very large capacity for excavation and removal of material.

The operation, described hereinbefore, continues until the frame 10 has been moved to one limit of its horizontal swinging movement, or the cutting blades 30 of the one wheel become disengaged from the surface of the bank of material being cut. At such time, the frame 10 and cutting wheels are advanced toward or into the bank of material so that the cutting blades 30 of the other wheel are moved into position to effect cutting of a layer of material away from the wall of the bank of material. The frame 10 and cutting wheels are then swung in the opposite direction so that the blades of the said other wheel will perform the cutting operations described hereinbefore with respect to the said one wheel, and the said one wheel assists in the material impelling operations described hereinbefore with respect to the said other wheel. In continued operation of the apparatus of the present invention then, the supporting frame 10 and the cutting wheels 26 are oscillated in a horizontal plane with respect to the bank of material being cut, with the wheels being advanced toward the bank at the end of each swinging stroke. The frame 10 may be lowered, of course, to position the wheel at a lower level for a series of horizontal sweeps in the same type of oscillatory movement as described above.

While express reference has been made hereinbefore to the operation of the device in such manner that the cutting blades effect a downward cut, it will be appreciated that the blades may be operated in the opposite direction so as to effect an upward cut, as has been described in my copending application.

The cutting operation of the apparatus of the present invention is substantially the same as that of my copending application. However, the present invention provides an improved drive, an outboard drive, that overcomes the disadvantages of the inboard drive provided by the apparatus of my copending application. For example, if reference be made to Figures 3 to 5, it will be pointed out wherein the outboard drive of the present invention lends itself to the incorporation of material breaking and conveying means that could not be utilized with an inboard drive. In Figures 3 to 5, apparatus the same or substantially the same as apparatus previously described, is indicated by the same reference numerals as applied hereinbefore.

Referring specifically to Figures 3 and 4, I have included in the apparatus previously described, means for breaking up and conveying material cut by the blades 30 and moved thereby into the space between the wheels 26. In the embodiment shown in Figures 3 and 4, the said means is in the form of a plurality of sets of fingers 50, each set being disposed adjacent the trailing edge of a blade and extending across or bridging the space between the rows of blades. The fingers may take various forms as desired. In the embodiment shown they preferably comprise stiffly resilient metallic straps, or plates, having a fixed mounting and extending substantially radially outward of the hubs 28 and terminating slightly inwardly of the outer edges of the blades, so that the fingers clear the guide plate 48. In other words, the material breaking and conveying fingers 50 are mounted between the rows of cutting blades and extend in substantially the same direction as the cutting blades. As shown, the fingers of each set of fingers are spaced apart so as to provide a material breaking characteristic and at the same time to insure conveying of the material out of the space between the two wheels. While the fingers serve to break up the material, it will be appreciated that the same will also effect movement of relatively large, hard pieces of material onto the conveyor to completely remove the material from between the wheels. Accordingly, the fingers assist the wheels in conveying the material from the space between the wheels and serve to break up or move the large particles of material, which are not readily moved by the wheels themselves.

To mount the fingers 50 for rotation with the digging wheels, a plurality of pheripherally spaced mounting bars or angle irons 52 are provided, each bridging the space between the wheels adjacent the trailing edge of a blade and each providing a mounting for one set of fingers 50. The bars 52 are preferably secured at the opposite ends thereof to the inner surface of the hubs 28 adjacent the periphery thereof. The fingers are mounted in spaced parallel relation on the bars in any suitable manner, such as by rivets or bolts 54. In assembly, the blades of the two wheels are preferably aligned and a bar 52 and set of fingers 50 is mounted at the trailing edge of each pair of aligned blades. In addition, the fingers 50 are preferably curved toward the leading edge of the blades, as shown, to provide an optimum conveying characteristic.

In Figure 5, I have shown a modified structure wherein all of the components of the apparatus are the same as described hereinbefore, with the exception that flexible fingers, such as chains 56, are substituted for the relatively rigid fingers 50. In use of the apparatus shown in Figure 5, centrifugal force will retain the chains in the extended position shown in the drawings to provide an action very similar to that described with respect to the rigid fingers. However, the chains are capable of performing a whipping action to effectively break up the material and may flex upon encountering stones or the like to prevent demage to the chains and other components of the apparatus.

In the use and operation of the apparatus as shown in Figures 3 to 5, the cutting and impelling action of the blades is substantially the same as that described hereinbefore, with the exception that as the material enters the space between the wheels, the same is broken up and propelled along by the fingers in conjunction with the propelling action of the inclined blades 30, to provide an efficient transfer of material to the conveyor 44. For the most part, the material will be fed to the conveyor in small particles to ease the load on the conveyor and insure retention of the material on the conveyor.

While I have described what I regard to be preferred embodiments of my invention, it will be apparent to those skilled in the art that various changes, rearrangements and modifications may be made therein without departing from the scope of the invention, as defined by the appended claims.

I claim:

1. Excavating apparatus comprising a rotatable shaft, a pair of wheels mounted in spaced parallel relation on said shaft, a plurality of cutting blades mounted on the periphery of each of said wheels, the cutting blades mounted on each wheel each presenting a surface inclined from the leading edge of the blade toward the other wheel, a substantially horizontal conveyor having its longitudinal axis disposed parallel to and intermediate said wheels, said conveyor extending substantially tangentially of said wheels at the lower portions thereof, said wheels being rotated to move said blades downwardly and rearwardly toward said conveyor, said surfaces of said blades forcing material excavated by said blades into the space between said wheels and in the direction of wheel rotation and discharging the material tangentially of said wheels at the lower portions thereof, a guide plate extending between said wheels adjacent the periphery of said blades at the lower portions of said wheels, said guide plate conforming substantially to the arcuate path of movement of the periphery of said blades and extending from between said wheels to the carrying surface of said conveyor to guide materials excavated by said blades and moved by said surfaces thereof onto said conveyor, a plurality of sets of fingers mounted in circumferentially spaced relation between said wheels, each set of fingers including a plurality of elongate flexible fingers fixed at their inner ends to said wheels inwardly of said blades in parallel relation to one another and said wheels, said fingers being of a length to extend generally radially of said wheels substantially to the periphery of said blades but terminating short of said guide plate to pass freely over said guide plate, said fingers assisting in breaking up the material between said wheels and in moving the material between said wheels onto and over said guide plate to said conveyor, and drive means disposed exteriorly of said wheels and blades and the space therebetween to accommodate said sets of fingers and rotation of said fingers with said wheels, said drive means being disposed vertically above said conveyor and at least at the height of said shaft and being operatively associated with said shaft to the outside of the wheels to rotate said wheels downwardly and rearwardly toward said conveyor.

2. Excavating apparatus comprising a shaft, a pair of large diameter rotatable wheels mounted on said shaft in spaced parallel relation, a plurality of cutting blades mounted on the periphery of each of said wheels, said cutting blades each presenting an inclined surface extending from the outer side of the respective wheel to the inner side thereof in the direction of wheel rotation, said surfaces of said blades forcing material excavated by said blades into the space between said wheels and in the direction of wheel rotation, and a plurality of sets of fingers extending between and fixed to said wheels inwardly of said blades, each set of fingers including a plurality of elongate flexible fingers disposed in parallel relation to one another and to said wheels between said wheels and extending substantially radially to the periphery of said blades to assist in breaking up the material between said wheels and to assist said surfaces of said blades in moving the material between said wheels in the direction of wheel rotation, said sets of fingers being mounted in circumferentially spaced relation between said wheels.

3. Excavating apparatus comprising a pair of wheels mounted in spaced relation for rotation about the same axis, a plurality of cutters carried in a single row by each wheel, said cutters being inclined from their leading edges toward the other wheel to force material excavated thereby into the space between said wheels, a plurality of sets of fingers mounted between said wheels, each set comprising a mounting bar bridging the space between said wheels and fixedly connected to said wheels and a plurality of fingers fixedly mounted in spaced parallel relation on said bar, said cutters and fingers extending radially outwardly of the axis of the wheels and the fingers of each set being disposed substantially in a plane, and means for rotating said wheels.

4. Excavating apparatus comprising a pair of wheels mounted in spaced relation for rotation about the same axis, a plurality of cutters carried in a single row by each wheel, said cutters being inclined from their leading edges toward the other wheel to force material excavated thereby into the space between said wheels, a plurality of sets of fingers mounted between said wheels, each set comprising a mounting bar bridging the space between said wheels and fixedly connected to said wheels and a plurality of fingers fixedly mounted in spaced parallel relation on said bar, and a power drive train for rotating said wheels, said train being disposed entirely outside of the space between said wheels and said cutters to accommodate rotation of said fingers.

5. The apparatus of claim 4, wherein the fingers of each set comprise a plurality of spaced parallel stiffly resilient straps fixed to said bar at their inner ends and extending substantailly radially therefrom in spaced parallel relation to one another and to said wheels substantially to the periphery of said blades.

6. The apparatus of claim 4, wherein the fingers of each set comprise a plurality of chains disposed in parallel relation to one another and to said wheels, said chains each being fixed at the inner end thereof to said bar to extend freely and generally radially therefrom.

7. Excavating apparatus comprising a frame, a drive shaft rotatably supported by said frame, a shaft extending in spaced parallel relation to said drive shaft and rotatably supported by said frame below said drive shaft, sprocket and chain means establishing driving connection between said drive shaft and said shaft with said chain means extending at an inclination to the horizontal, a pair of wheels fixed to said shaft in spaced parallel relation, said sprocket and chain means and said drive shaft being mounted exteriorly of the space between said wheels, each wheel including a plurality of cutting blades extending substantially radially of said shaft, said cutting blades each presenting an inclined surface extending from the outer side of the respective wheel to the inner side thereof in the direction of rotation of said wheels, said wheels being rotated to move said blades forwardly and downwardly with respect to said drive shaft, said surfaces of said blades forcing material excavated by said blades into the space between said wheels and in the direction of wheel rotation to discharge the material generally tangentially of said wheels at the lower portions thereof, a guide plate secured to said frame beneath said shafts and extending from beneath said drive shaft between said wheels toward the leading edges of said cutting blades adjacent the peripheral edges thereof at the lower portions of said wheels, a conveyor mounted on said frame beneath said shafts adjacent said guide plate and extending adjacent the lower portions of said wheels with its longitudinal axis parallel to the plane of said wheels between said wheels, said guide plate extending from between said wheels toward said conveyor to guide material excavated by said blades and moved by said surfaces thereof to said conveyor from between said wheels, a plurality of sets of fingers mounted between said wheels, each set comprising a mounting bar bridging the space between said wheels and fixedly connected to said wheels and disposed adjacent the trailing edges of a pair of opposed cutting blades, and a plurality of fingers fixedly mounted in spaced parallel relation on said bar, said fingers being adapted to break up material excavated by said wheels and to assist in conveying the same onto and over said guide plate, means disposed vertically above said conveyor adjacent said drive shaft for rotating said drive shaft, and means for moving said conveyor.

References Cited in the file of this patent

UNITED STATES PATENTS

| | | |
|---|---|---|
| 287,563 | Morton | Oct. 30, 1883 |
| 779,442 | Richmond et al. | Jan. 10, 1905 |
| 818,214 | Anderson | Apr. 17, 1906 |
| 847,330 | Grossmith | Mar. 19, 1907 |
| 1,552,750 | Lain | Sept. 8, 1925 |
| 1,762,441 | Johnson | June 10, 1930 |
| 1,777,575 | Penney | Oct. 7, 1930 |
| 2,559,048 | Seaman | July 3, 1951 |
| 2,624,129 | Steece | Jan. 6, 1953 |